United States Patent [19]

Hata et al.

[11] Patent Number: 5,019,917
[45] Date of Patent: May 28, 1991

[54] COORDINATE INPUT APPARATUS

[75] Inventors: Toshihiko Hata; Mitsunori Adachi; Satoru Tomita, all of Amagasaki, Japan

[73] Assignee: Mitsubishi Denki Kabushiki Kaisha, Tokyo, Japan

[21] Appl. No.: 197,421

[22] Filed: May 23, 1988

[30] Foreign Application Priority Data

May 28, 1987 [JP] Japan .................. 62-132244

[51] Int. Cl.⁵ ................. H04N 1/23; H04N 1/024
[52] U.S. Cl. ...................... 558/448; 358/452; 358/464
[58] Field of Search .......... 358/256, 288, 285, 448, 358/452, 453, 464, 474, 400, 80, 75; 382/22, 48, 59; 340/707

[56] References Cited

U.S. PATENT DOCUMENTS

| | | | |
|---|---|---|---|
| 4,113,353 | 9/1978 | Matsushita | 350/171 |
| 4,349,279 | 9/1982 | Jung | 358/80 |
| 4,393,399 | 7/1983 | Gast et al. | 358/80 |
| 4,617,596 | 10/1986 | Yoshida | 358/280 |
| 4,641,199 | 2/1987 | Miyagi | 358/285 |
| 4,667,248 | 5/1987 | Kanno | 358/280 |
| 4,684,999 | 8/1987 | Sakakibara | 358/256 |
| 4,692,796 | 9/1987 | Yamada et al. | 358/75 |
| 4,733,304 | 3/1988 | Homma et al. | 358/453 |
| 4,760,608 | 7/1988 | Suzuki | 358/256 |
| 4,884,224 | 11/1989 | Hirosawa | 382/22 |

FOREIGN PATENT DOCUMENTS 2173665A  10/1986  United Kingdom .

OTHER PUBLICATIONS

F. A. Wang, "The Wang Professional Image Comp.: A New Dim. to Pers. and Off. Comp."; vol. 72, #3; pp. 300–311.
G. Nagy, "Opt. Scan. Dig."; Computer; vol. 16, No. 5; pp. 13–23; May 83.
K. Sato; "2D Coordinate Input Device with CCD Camera"; Papers of Ele. Communication Soc.; 84/6, vol. J67-D, No. 6, pp. 726–727.

Primary Examiner—Edward L. Coles, Sr.
Assistant Examiner—Jerome Grant, II
Attorney, Agent, or Firm—Burns, Doane, Swecker & Mathis

[57] ABSTRACT

A coordinate input apparatus of the present invention in which operation is switchable from an image pickup mode for displaying on a display apparatus an image of an object for image-taking to a coordinate input mode for inputting coordinates at a location indicated by a point indicator and vice versa, so that when the coordinate input mode is set, the duration of scanning by an image pickup element is controlled shorter than that in the case of the image pickup mode being set, whereby the duration required for image pickup during coordinate input mode operation can be reduced and speedy processing can be achieved for coordinate inputting, and which is provided with an image processing circuit for optimum image processing with respect to image signals for images taken, so that images taken in short image pickup duration during coordinate input mode can be prevented from deterioration.

5 Claims, 10 Drawing Sheets

Fig. 7(a)
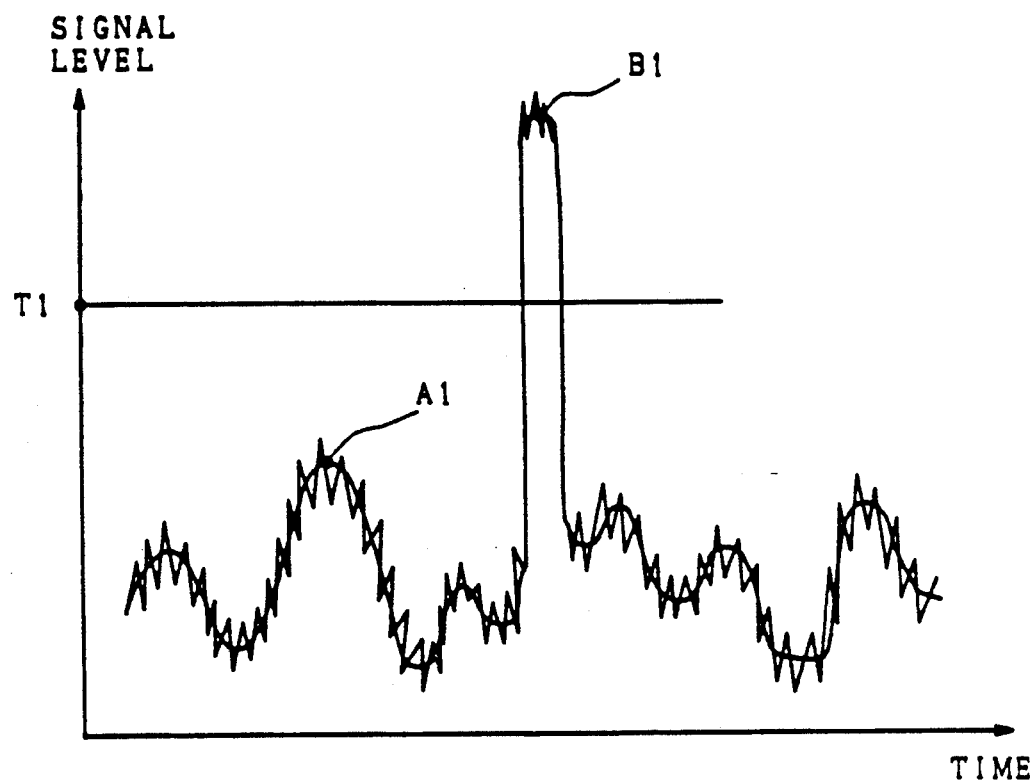
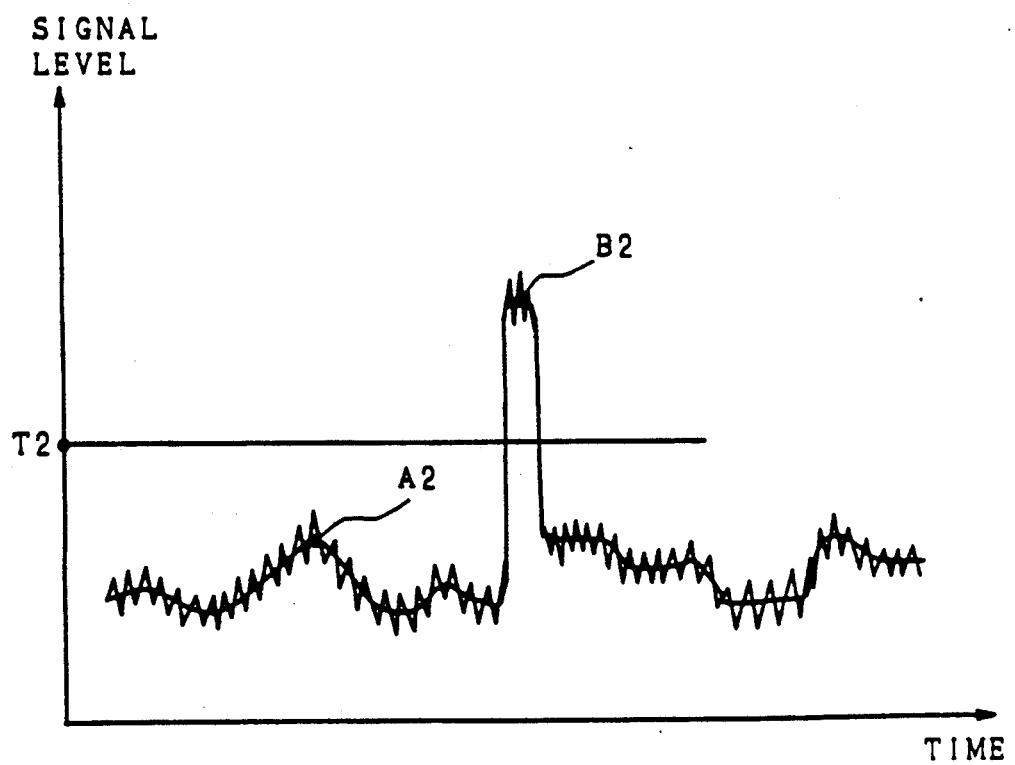
Fig. 7(b)

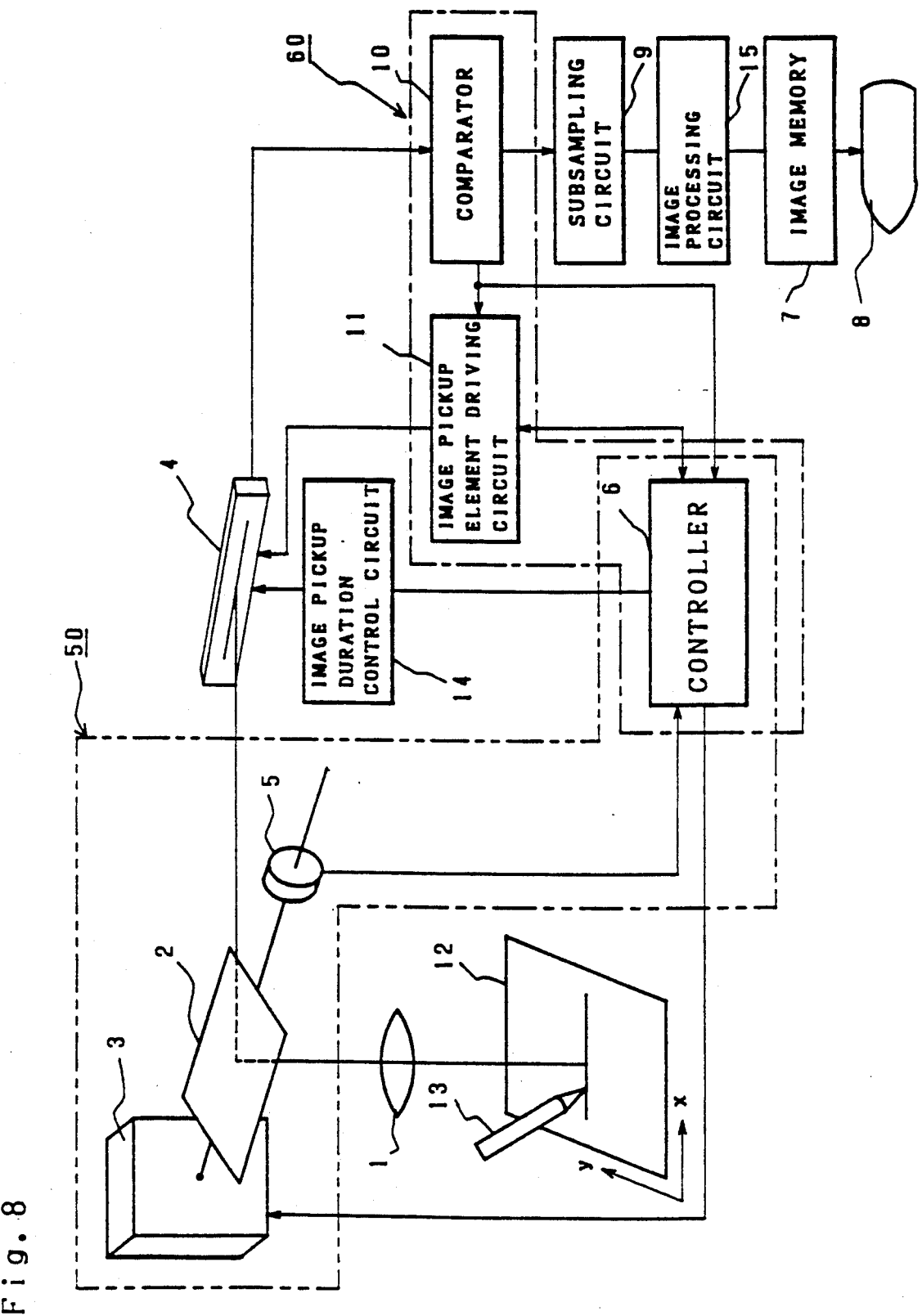

COORDINATE INPUT APPARATUS

BACKGROUND OF THE INVENTION

1. Field of the Invention

This invention relates to an apparatus for inputting location coordinates on an object for image-taking, such as an original or the like, to an image analysis unit, a computer, or the like and, more particularly, to an apparatus for inputting as coordinates, locations indicated by a point indicator within a visual field of an image pickup apparatus.

2. Description of the Prior Art

Coordinate input apparatuses of the type which utilize, for example, a TV camera or an image pickup apparatus such as a camera-type image scanner, have hitherto been put in practical use. Apparatuses of this kind, as compared with other coordinate input apparatuses such as those of using the tablet and the mouse, have the following advantages:

(1) that they do not require any special-type flat bed, or tablet, for inputting coordinates;

(2) that no signal line is required which connects between a device for designating coordinates (i.e., a mouse or the like) and a body; and (3) that they can perform not only coordinate inputting, but also image data inputting.

As such coordinate input apparatus, for example, one disclosed in Japanese Patent Laid-Open No. 62-47734 is known. This one is a coordinate input apparatus which employs a camera-type image scanner. FIG. 1 is a schematic view showing an outline arrangement of the apparatus, with its mechanical portion shown schematically and its circuit portion shown in the form of a block diagram.

In FIG. 1, reference numeral 1 designates an objective lens disposed in opposed relation to an original 12 as an object for image-taking and between the original 12 and a rotative scanning mirror 2.

The rotative scanning mirror 2, or more concretely a Galvano mirror, is rotated by a drive unit 3.

The drive unit 3 drives the rotative scanning mirror 2 into rotation as above mentioned, causing the latter to change its angle of rotation, said angle of rotation being controlled by a controller 6.

Numeral 4 is a one-dimensional image pickup element using, for example, a CCD (charge coupled device) or the like, which is disposed at a location selected so that rays of light reflected by the rotative scanning mirror 2 will incide thereon. This image pickup element 4 converts light rays incident thereon into electrical signal and outputs the same to a comparator 10.

Numeral 5 is a rotation angle detector of, for example, a rotary encoder or the like for detecting the angle of rotation of the rotative scanning mirror 2, the detected output of the detector 5 being given to the controller 6.

The controller 6 controls the drive unit 3 as above mentioned, and in addition, it controls scanning operation of the image pickup element 4 through an image pickup element driving circuit 11 and receives signals from the rotation angle detector 5 and a comparator 10.

An image signal from the image pickup element 4 is given to a subsampling circuit 9 through the comparator 9 and is subsequently stored in an image memory 7.

The comparator 10 has a certain threshold value preset therein so that if a level of an image signal inputted from the image pickup element 4 exceeds the threshold value, the comparator 10 supplies a predetermined signal to the controller 6. The threshold value set in the comparator 10 is set lower than the value of luminance of an LED as a light emitting element provided at the front end of a point indicator 13 which will be hereinafter described. The comparator 10 does not perform processing with respect to any image signal received from the image pickup element 4 and outputs the same as it is to the subsampling circuit 9.

The subsampling circuit 9 outputs to the image memory 7 image signals received form the image pickup element 4 through the comparator 10 after thinning the number of pixels therein.

The image memory 7 is a page memory for storing image signals inputted from the subsampling circuit 9. Image signals for one page of image which have been stored in the image memory 7 are displayed on a display apparatus 8 such as CRT display. The subsampling circuit 9 is used only in the case where the capacity of the image memory 7 is comparatively small, and it need not be provided if the image memory 7 has a sufficient capacity.

The image pickup element driving circuit 11 supplies to the image pickup element 4 such control signals as reset pulses and transfer clocks to thereby drive and control the image pickup element 4.

The original 12 has an object for image-taking may be a document, a drawing or the like which is written on an ordinary paper sheet, or may be one of any kind unless it includes an object or reflective material having an luminance close to, or higher than the luminance of the LED of the point indicator 13.

As can be seen in FIG. 1, the direction of orientation on the original 12 that corresponds to the direction of element alignment on the image pickup element 4, that is, the direction of main scanning is taken as X direction, and a direction perpendicular to the direction of main scanning, that is, the direction of subscanning, is taken as Y direction.

The point indicator 13, as mentioned above, has an LED as a light emitting element provided at its front end, which is used for indicating a location on the original 12.

Next, the operation is explained. A two-dimensional image of the original 12 and the point indicator 13 is formed by a lens 1 and reflected by the rotative mirror 2 so that it is formed as such on the one-dimensional image pickup element 4. The rotative mirror 2 is tilted to a designated rotational angle by a digital code or analog voltage signal supplied by the controller 6 to the rotative mirror drive unit 3 for designation of the rotational angle, so that any optional main scan portion of the two-dimensional image is formed on the image pickup element 4, which is utilized for feed so that line sequence scanning is carried out as in the case of a TV camera. The rotation angle detector 5 is a mechanical-type or optical-type rotary encoder which detects the rotation angle of the rotative mirror 2 at present moment and outputs a signal thereof, the output being used for calculating the difference between the rotation angle specified by the controller 6 and that at present moment, thereby effecting rotation angle control. The one-dimensional image pickup element 4 driven by the image pickup driving circuit 11 performs image pickup synchronously with subscanning, and image signals from it are stored in the image memory 7 after only necessary portions thereof in the main scanning direction have been selected by the subsampling circuit 9, the stored signals being displayed as an image on the display apparatus 8.

FIG. 2 is a flow chart showing the operational sequence of an original image pickup mode applicable to the prior art arrangement shown in FIG. 1 in which the original 12 is repeatedly scanned all over for image reading, the image being then displayed on the display apparatus 8.

Firstly at step 22, the rotative mirror 2 is set at a predetermined angle (y=0) by the controller 6 and the rotative mirror drive unit 3 so that a leading line of the original 12 can be read. At step 23, the image pickup element 4 is driven by the controller 6 and the image pickup element driving circuit 11, and a one line image in the main scanning direction is taken, image signals thereof being then outputted. At step 24, only necessary portions of the image signals are selected by the subsampling circuit 9, and at step 25 the selected signals are written in the image memory 7 so that they are sequentially displayed on the display apparatus 8. At step 26, calculation is made of an address in the direction of subscanning which corresponds to the next line of the original 12 of which image pickup is required, so that the rotative mirror 2 is set at a corresponding angle (y+Δy) in the same manner as at step 22.

At step 28, the address in the direction of subscanning and an address of final line the original are compared with each other, and if whole frame reading has been completed, the same procedure as at step 22 is repeated at step 29 for angle resetting (y=0) with respect to the rotative mirror 2. At step 27, each time one line reading and display processing are made as above mentioned, decision is made as to whether an instruction for display mode end has been given by the operator, from input devices not shown, such as key board and mouse or the like, connected to the controller 6, and if the decision is "yes", the display mode is terminated. In the image pickup mode, the comparator 10 does not operate and image signals outputted from the image pickup element 4 are supplied as such to the subsampling circuit 9.

FIG. 3 is a flow chart showing the operational sequence of a coordinate input mode applicable to the prior art arrangement shown in FIG. 1 in which a coordinate is detected of a point on the original 12 which is indicated by the point indicator 13 with a light emitting element mounted thereon.

In FIG. 3, at steps 22, 23, 26, 27, and 29, processing is carried out in the same way as at the corresponding steps in FIG. 2 so that the original 12 and the point indicator 13 are scanned in line sequence for image taking. At step 23, image signals outputted from the image pickup element 4 are supplied to the comparator 10. At step 32, image signals supplied are compared by the comparator 10 with a threshold value of luminance signal level which is preset by the controller 6 or the like and in the case where the signals are higher than the threshold value, the comparator outputs a predetermined signal to the controller 6 and the image pickup element driving circuit 11.

The threshold value of luminance signal level with which image signals are compared is set at such a value as to make it possible to distinguish the original 12 from the light emitting element of the point indicator 13, for example, at a medium value between a maximal value of luminance signals of the original 12 and a luminance signal of the light emitting element of the point indicator 13.

The image pickup element driving circuit 11 gives transfer clock to enable the image pickup element 4 to pick up images and output image signals. The transfer clock is synchronous with image signals supplied to the comparator 10, therefore, by setting transfer clocking at the time of reset pulsing of the image pickup element driving circuit 11 for image pickup of a new line by the image pickup element 4, it is possible to detect an address in the main scanning direction (x address) of image signals supplied to the comparator 10 at a particular point of time. When the comparator outputs a signal, the image pickup element driving circuit 11 which has received the signal retains the count value of the transfer clock, and at step 33 the controller 6 reads the value so retained, whereby an x address of the point indicated by the point indicator 13 can be obtained. As is clear from steps 22, 26 and 29, the rotative mirror drive unit 3 has been given y address by the controller 6 and at step 33 x and y addresses of the designated point are already obtained. Thus the coordinate input mode terminates.

In the comparator 10, a more comparison is made between image signals and the threshold value and no processing is carried out with respect to image signals. Therefore, in the coordinate input mode, image signals are supplied from the comparator 10 to the subsampling circuit 9, whereby coordinate input operation can be made more efficiently.

Constructed as above described, the conventional coordinate input apparatus has a disadvantage that the speed of coordinate detection is determined mainly by the duration taken for image pickup by the image pickup element, so that in the case where a high quality image having a high degree of resolution and high graduation has to be picked up, an image pickup duration of, for example, 3 ms/line is required and in the case where the image is of such a high resolution as 1000 lines in the direction of subscanning, coordinate detection requires 3 seconds at maximum. Such slow rate of response poses a problem in respect of man-machine interface.

SUMMARY OF THE INVENTION

The present invention is intended to eliminate the foregoing difficulty with the conventional coordinate input apparatus, and accordingly it is a primary object of the invention to provide a coordinate input apparatus which is able to pick up a high quality image having a high degree of resolution and high gradation and yet fast responsive in coordinate inputting.

It is a second object of the invention to provide a coordinate input apparatus which can perform coordinate inputting at higher efficiency through designation on an image having high quality by a point indicator of points on an original.

The coordinate input apparatus of the invention is selectively switchable from an image pickup mode for displaying an image to be picked up on a display apparatus to a coordinate input mode for inputting an address of a point indicated by a point indicator, and vice versa, and is so designed that in the case where the apparatus is set for the coordinate input mode, the duration of scanning by an image pickup element is controlled to be shorter than in the case of the apparatus being set for the image pickup mode. Through this arrangement, the duration required for image pickup during the coordinate input mode operation is reduced so that high speed coordinate inputting can be achieved.

The coordinate input apparatus in accordance with the invention has an image processing circuit for performing optimum image processing corresponding to the image pickup duration with respect to image signals given, with the advantage that the image taken in a short duration during the coordinate input mode can be prevented from deterioration and that greater ease of operation can be obtained.

The above and further objects and features of the invention will more fully be apparent from the following detailed description with accompanying drawings.

BRIEF DESCRIPTION OF THE DRAWINGS

FIGS. 7(a),(b) are wave form diagrams showing two types of image signals produced during image pickup;

FIG. 8 is a schematic view, with a block diagram, showing an outline arrangement of another embodiment of the coordinate input apparatus according to the invention;

DESCRIPTION OF THE PREFERRED EMBODIMENTS

The invention will now be described in further detail with reference to the accompanying drawings which illustrates preferred embodiments thereof.

Figure 4:
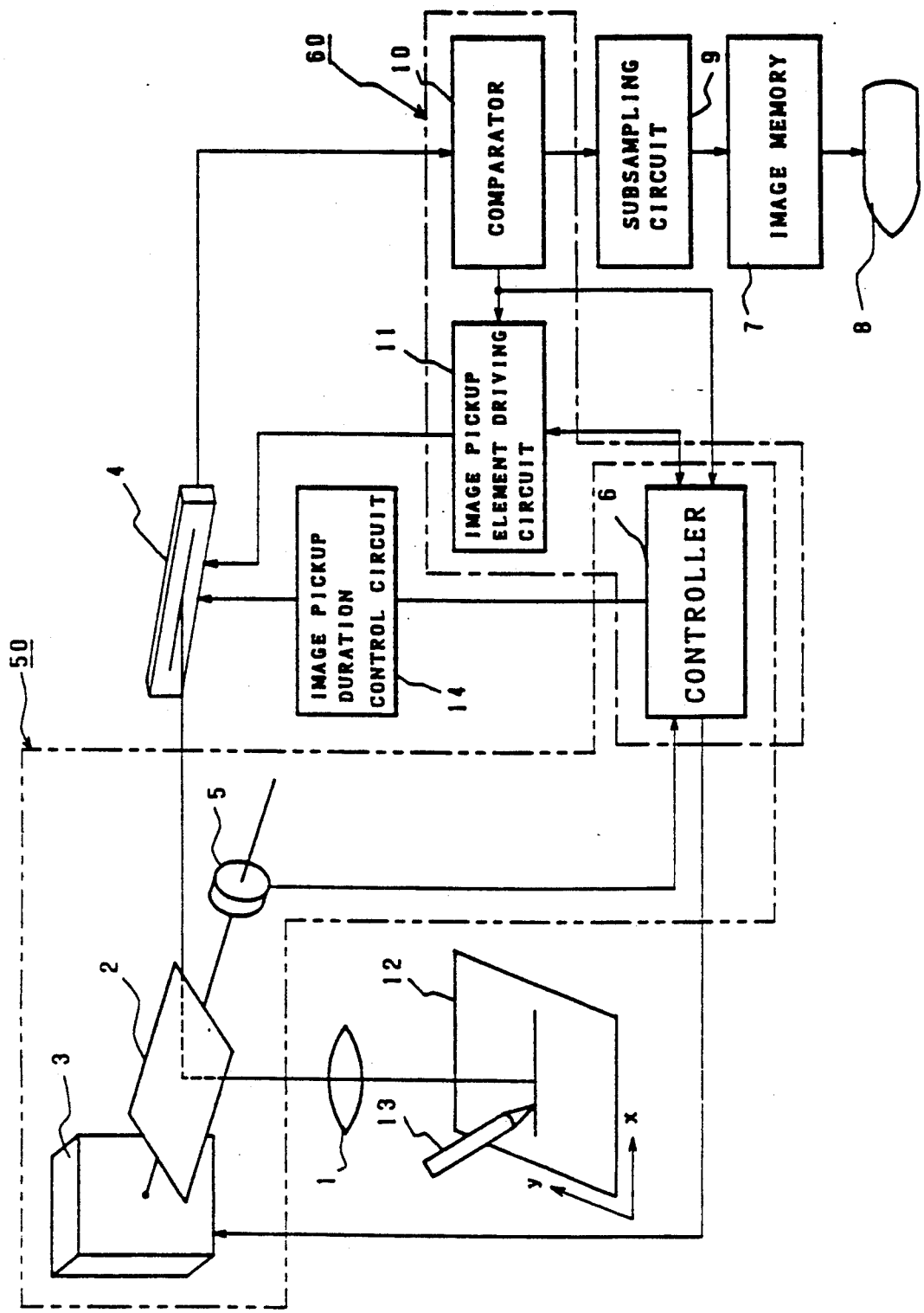
FIG. 4 is a view showing a schematic arrangement of a coordinate input apparatus according to the invention, with a mechanical portion schematically shown and a circuit portion shown in a block diagram.

FIG. 4 is a schematic view showing an outline arrangement of the coordinate input apparatus of the invention, with its mechanical portion shown schematically and its circuit portion shown in the form of a block diagram.

Figure 1:
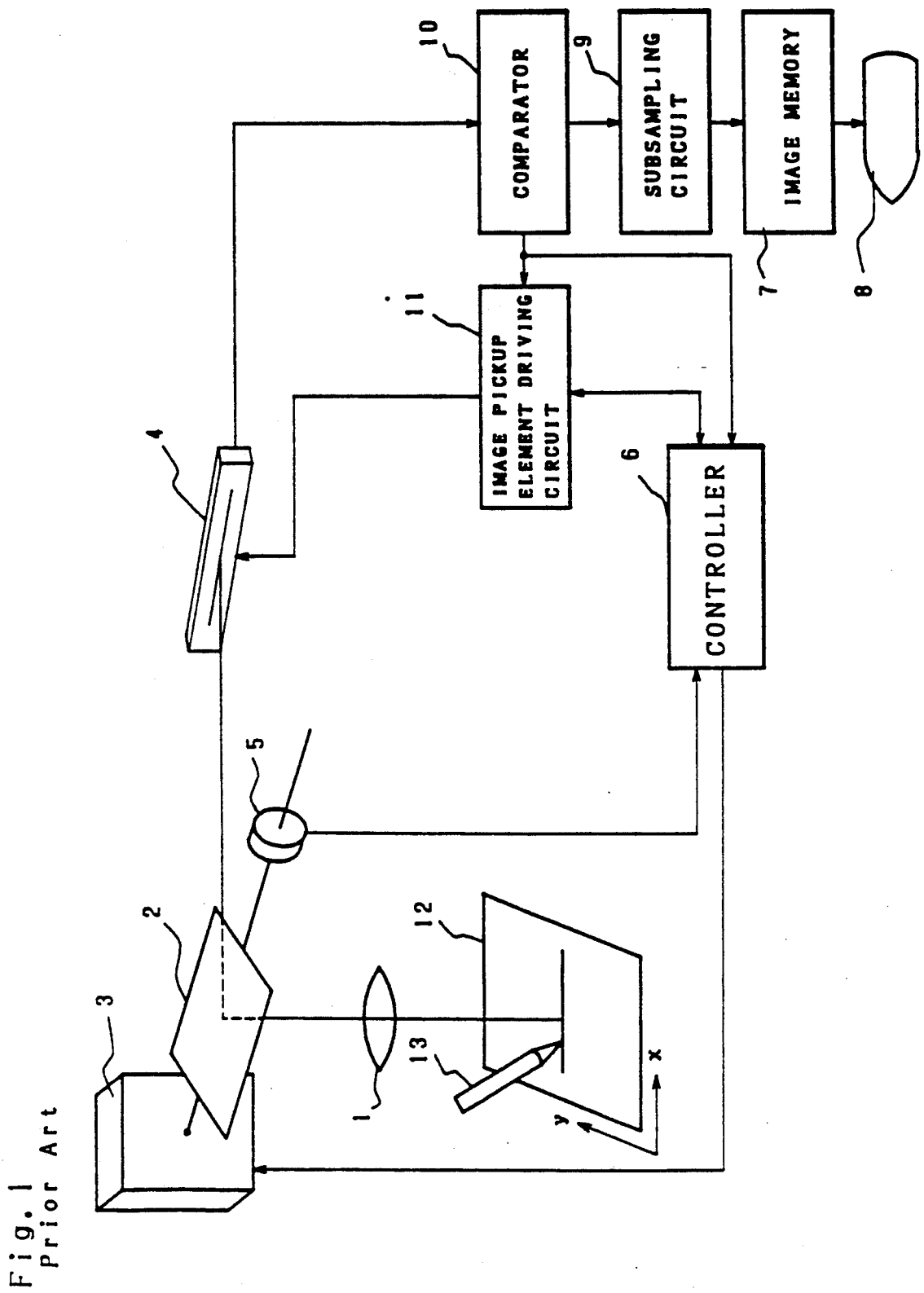
FIG. 1 is a schematic view of a conventional coordinate input apparatus, with a mechanical portion schematically shown and a circuit portion shown in a block diagram.

In FIG. 1, reference numeral 1 designates an objective lens disposed in opposed relation to an original 12 as an object for image-taking and between the original 12 and a rotative scanning mirror 2.

The rotative scanning mirror 2, or more concretely a Galvano mirror, is rotated by a drive unit 3.

The drive unit 3 drives the rotative scanning mirror 2 into rotation as above mentioned, causing the latter to change its angle of rotation, said angle of rotation being controlled by a controller 6.

Numeral 4 is a one-dimensional image pickup element using, for example, a CCD (charge coupled device) or the like, which is disposed at a location selected so that rays of light reflected by the rotative scanning mirror 2 will incide thereon. This image pickup element 4 converts light rays incident thereon into electrical signal and outputs the same to a comparator 10. Also, the duration required for image pickup performed by the image pickup element 4, that is, the duration required for signal reading per line, can be varied by means of an image pickup duration control circuit 14.

Numeral 5 is a rotation angle detector of, for example, a rotary encoder or the like for detecting the angle of rotation of the rotative scanning mirror 2, the detected output of the detector 5 being given to the controller 6.

The controller 6 controls the drive unit 3 as above mentioned, and in addition, it controls scanning operation of the image pickup element 4 through an image pickup element driving circuit 11 and receives signals from the rotation angle detector 5 and a comparator 10. Further, the controller 6 controls aforesaid image pickup duration control circuit 14. More specifically, it variably controls the duration required for image pickup performed by the image pickup element 4 depending upon whether operation is in the image pick-up mode or in the coordinate input mode. That is, if, by manipulation of a keyboard or switches or the like attached to a point indicator 13, mode setting is externally switched from image pickup mode to coordinate input mode or vice versa, the controller 6 detects the changeover and performs proper control accordingly.

An image signal from the image pickup element 4 is given to a subsampling circuit 9 through the comparator 9 and is subsequently stored in an image memory 7.

The comparator 10 has a certain threshold value preset therein so that if a level of an image signal inputted from the image pickup element 4 exceeds the threshold value, the comparator 10 supplies a predetermined signal to the controller 6. The threshold value set in the comparator 10 is set lower than the value of luminance of an LED as alight emitting element provided at the front end of a point indicator 13 which will be hereinafter described. The comparator 10 does not perform processing with respect to any image signal received from the image pickup element 4 and outputs the same as it is to the subsampling circuit 9.

The subsampling circuit 9 outputs to the image memory 7 image signals received form the image pickup element 4 through the comparator 10 after thinning the number of pixels therein.

The image memory 7 is a page memory for storing image signals inputted from the subsampling circuit 9. Image signals for one page of image which have been stored in the image memory 7 are displayed on a display apparatus 8 such as CRT display. The subsampling circuit 9 is used only in the case where the capacity of the image memory 7 is comparatively small, and it need not be provided if the image memory 7 has a sufficient capacity.

The image pickup element driving circuit 11 supplies to the image pickup element 4 such control signals as reset pulses and transfer clocks to thereby drive and control the image pickup element 4.

The original 12 as an object for image-taking may be a document, a drawing or the like which is written on an ordinary paper sheet, or may be one of any kind unless it includes an object or reflective material having a luminance close to, or higher than the luminance of the LED of the point indicator 13.

As can be seen in FIG. 1, the direction of orientation on the original 12 that corresponds to the direction of element alignment on the image pickup element 4, that is, the direction of main scanning is taken as X direction, and a direction perpendicular to the direction of main scanning, that is, the direction of subscanning, is taken as Y direction.

The point indicator 13, as mentioned above, has an LED as a light emitting element provided at its front end, which is used for indicating a location on the original 12.

Aforesaid image pickup duration control circuit 14, under an instruction from the controller 6, controls the duration of image pickup performed by the image pickup element 4.

In addition, in this apparatus of this invention, reference numerals 1 to 13 are as same as parts of above mentioned conventional apparatus.

Further more, a scanning control apparatus 50 is composed by the controller 6, rotative scanning mirror 2, drive unit 3, rotation angle detector 5 and the image pickup element driving circuit 11, and location detecting apparatus 60 is composed by the controller 6, comparator 10 and the image pickup element driving circuit 11.

Figure 5:
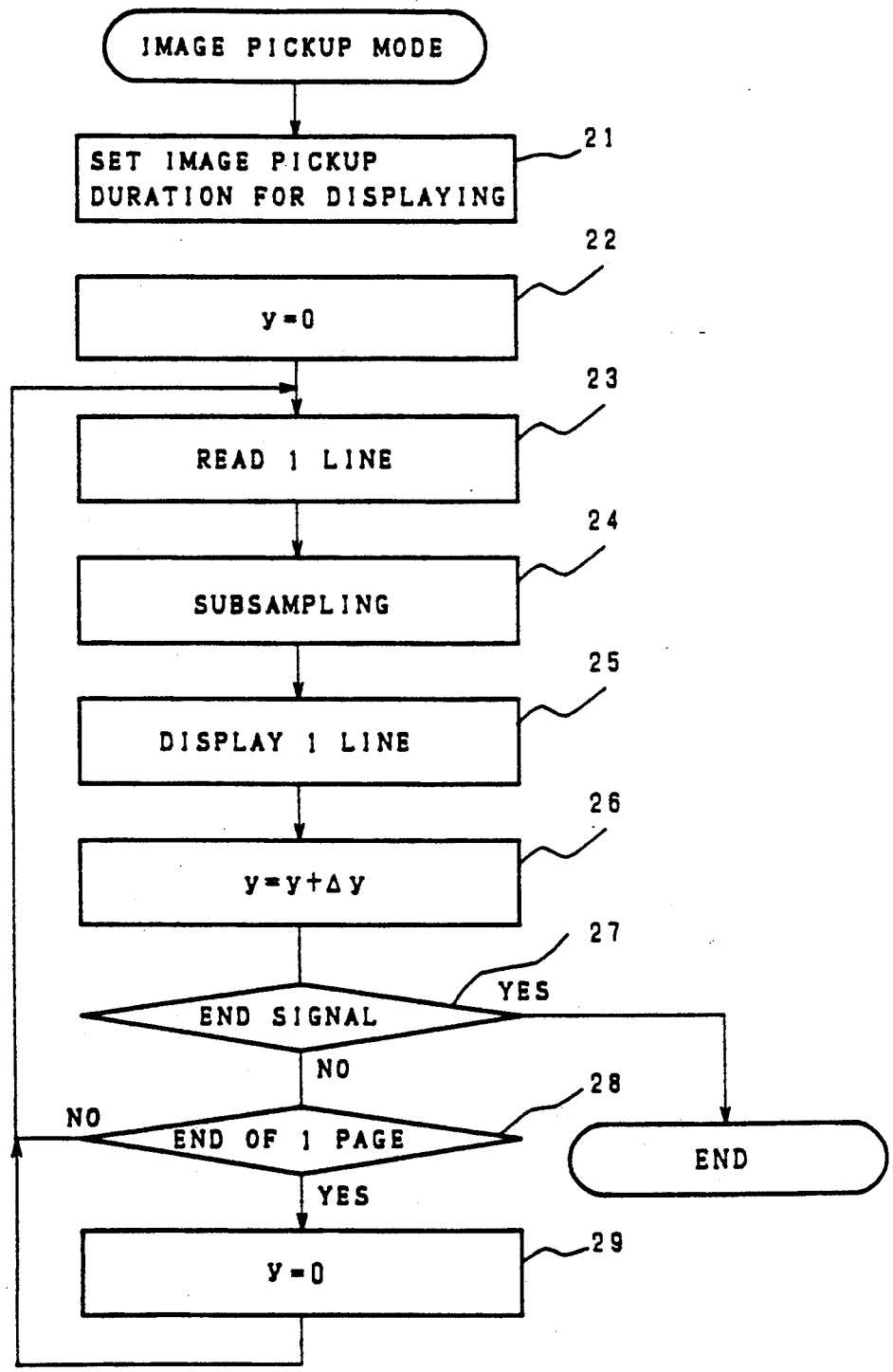
FIG. 5 is a flow chart showing the sequence of processing during an image pickup mode operation thereof.

FIG. 5 is a flow chart showing the procedure of image pickup mode operation in the first embodiment of the apparatus of the invention shown in FIG. 4.

Firstly, at step 21, the controller 6 selects the duration required for image pickup performed by the image pickup element 4 in order to pickup an image having image characteristics (such as resolution, gradation, and S/N or the like) suitable for different purposes, such as display, transmission, storage or the like, and sets the selected duration in the image pickup duration control circuit 14.

Figure 2:
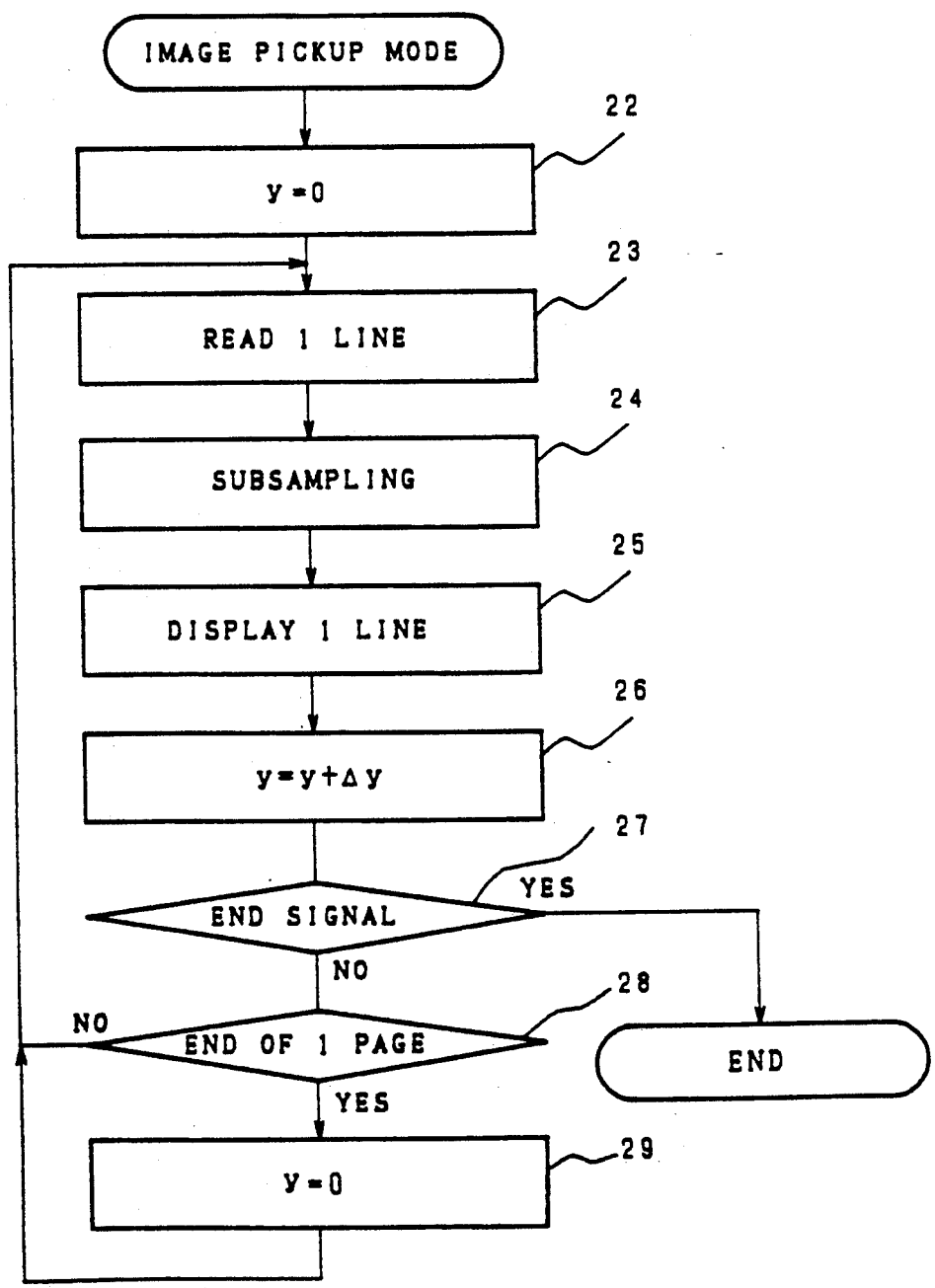
FIG. 2 is a flow chart showing the sequence of processing during an image pickup mode operation thereof.

At steps 22 to 29, the same processing as that in the image pickup mode of the conventional arrangement shown in FIG. 2, and image pickup is performed according to the duration set by the controller 6 for that purpose.

Concretely, at step 22, the rotative mirror 2 is set at a predetermined angle (y=0) by the controller 6 and the rotative mirror drive unit 3 so that a leading line of the original 12 can be read. At step 23, the image pickup element 4 is driven by the controller 6 and the image pickup element driving circuit 11, and a one line image in the main scanning direction is taken, image signals thereof being then outputted. At step 24, only necessary portions of the image signals are selected by the subsampling circuit 9, and at step 25 the selected signals are written in the image memory 7 so that they are sequentially displayed on the display apparatus 8. At step 26, calculation is made of an address in the direction of subscanning which corresponds to the next line of the original 12 of which image pickup is required, so that the rotative mirror 2 is set at a corresponding angle (y+Δy) in the same manner as at step 22.

At step 28, the address in the direction of subscanning and an address of final line the original are compared with each other, and if whole frame reading has been completed, the same procedure as at step 22 is repeated at step 29 for angle resetting (y=0) with respect to the rotative mirror 2. At step 27, each time one line reading and display processing are made as above mentioned, decision is made as to whether an instruction for display mode end has been given by the operator, from input devices not shown, such as key board and mouse or the like, connected to the controller 6, and if the decision is "yes", the display mode is terminated. In the image pickup mode, the comparator 10 does not operate and image signals outputted from the image pickup element 4 are supplied as such to the subsampling circuit 9.

Figure 3:
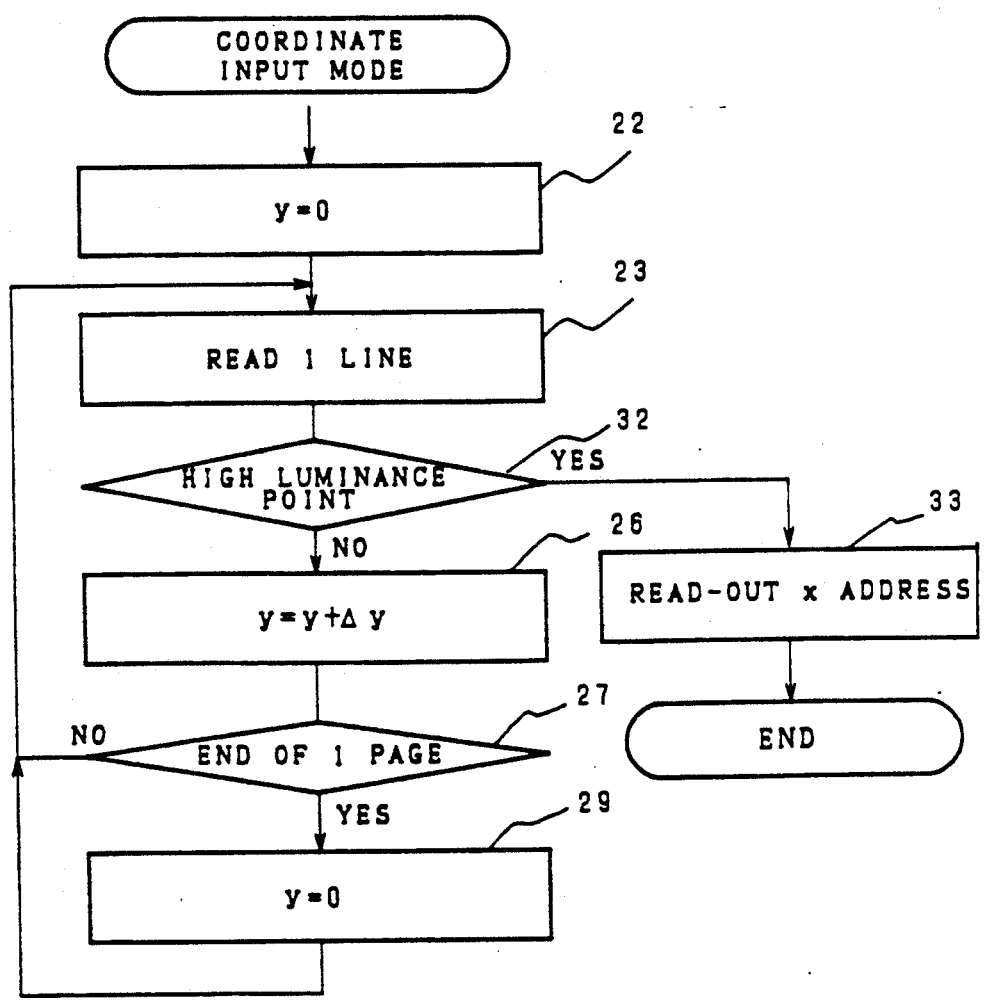
FIG. 3 is a flow chart showing the sequence of processing during a coordinate input mode operation thereof.
Figure 6:
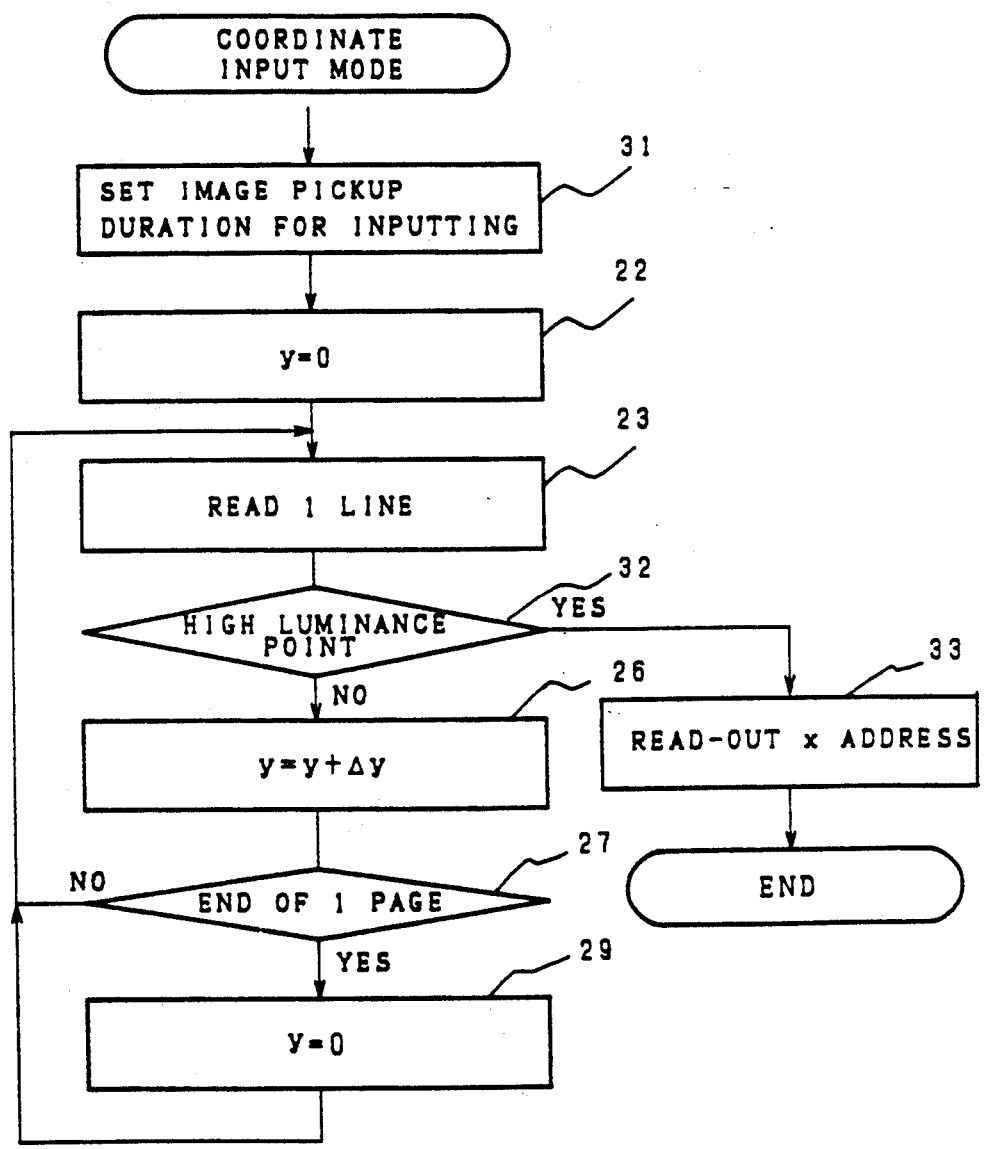
FIG. 6 is a flow chart showing the sequence of processing during a coordinate input mode operation thereof.

FIG. 6 is a flow chart showing the procedure of coordinate input mode operation shown in the FIG. 4 embodiment. At steps 22 to 29, 32 and 33, the same processing as that in the coordinate input mode of the conventional arrangement described with referring the FIG. 3, and the location of a point on the original 12 indicated by the point indicator 13 is detected.

The present invention is quite different from the conventional arrangement in that at step 31, a shorter image pickup duration than that required for image pickup by the image pickup element 4 of a high quality image in image pickup mode operation is set by the controller 6 in the image pickup duration control circuit 14. In coordinate inputting, the image signal picked up in the shortened duration for image pickup is used. It is for the following reasons that a reduced duration for image pickup can be applied in coordinate input mode operation in this way.

Generally, with an image pickup element, such as CCD, it is possible to obtain image signals of high luminance level by taking longer duration for image pickup, but noise components attributable to the image pickup element itself, (e.g., dark current components, receptor element variations, etc. in case of CCD), and those due to the electric circuit system are roughly constant regardless of the period for image pickup.

FIGS. 7(a) and 7(b) are illustrative of image signals in the case of prolonged duration being taken for image pickup and those in the case of relatively short duration being taken for the purpose, respectively. In the figures, points A1 and A2 are peak values of image signals for an original 12, and points B1 and B2 are image signals for the LED as the light emitting element of the point indicator 13. Threshold values for distinguishing the original 12 and the LED of the point indicator 13 from each other in the coordinate input mode operation are set at T1 and T2, that is, medium values between point A1 and point B1 and between point A2 and point B2 respectively. As is apparent from the figures, in order to obtain from the original 12 an image having less noise and high gradation, it is necessary to take longer duration for image pickup (see FIG. 7(a)). For the purposes of distinguishing the original 12 and the point indicator 13 from each other, how ever, it is only sufficient to take relatively short duration (see FIG. 7(b)). Further, naturally enough, in the case where there is greater difference between the maximum luminance signal for the original 12 and the luminance signal of the light emitting element of the point indicator 13, it is more possible to reduce the duration required for image pickup in coordinate input mode operation.

After the step 31, at steps 22, 23, 26, 27, and 29, processing is carried out in the same way as at the corresponding steps in FIG. 5 so that the original 12 and the point indicator 13 are scanned in line sequence for image taking. At step 23, image signals outputted from the image pickup element 4 are supplied to the comparator 10. At step 32, image signals supplied are compared by the comparator 10 with a threshold value of luminance signal level which is preset by the controller 6 or the like and in the case where the signals are higher than the threshold value, the comparator outputs a predetermined signal to the controller 6 and the image pickup element driving circuit 11.

The threshold value of luminance signal level with which image signals are compared is set at such a value as to make it possible to distinguish the original 12 from the light emitting element of the point indicator 13, for example, at a medium value between a maximal value of luminance signals of the original 12 and a luminance signal of the light emitting element of the point indicator 13.

The image pickup element driving circuit 11 gives transfer clock to enable the image pickup element 4 to pick up images and output image signals. The transfer clock is synchronous with image signals supplied to the comparator 10, therefore, by setting transfer clocking at the time of reset pulsing of the image pickup element driving circuit 11 for image pickup of a new line by the image pickup element 4, it is possible to detect an address in the main scanning direction (x address) of image signals supplied to the comparator 10 at a particular point of time. When the comparator outputs a signal, the image pickup element driving circuit 11 which has received the signal retains the count value of the transfer clock, and at step 33 the controller 6 reads the value so retained, whereby an x address of the point specified by the point indicator 13 can be obtained. As is clear from steps 22, 26 and 29, the rotative mirror drive unit 3 has been given y address by the controller 6 and at step 33 x and y addresses of the designated point are already obtained. Thus the coordinate input mode terminates.

In the comparator 10, a mere comparison is made between image signals and the threshold value and no processing is carried out with respect to image signals. Therefore, in the coordinate input mode, image signals are supplied from the comparator 10 to the subsampling circuit 9, whereby coordinate input operation can be made more efficiently.

FIG. 8 is a schematic view showing an outline arrangement of another embodiment of the invention.

In the FIG. 8, parts shown by numerals 1 to 14 are identical with those in the first embodiment shown in FIG. 4. Numeral 15 is an image processing circuit in which image processing suitable for the duration required for image pickup performed by the image pickup element 4 is carried out with respect to image signals outputted from the image pickup element 4.

In this embodiment, in order to display on the display apparatus 8 the condition of movement of the point indicator 13 on the original 12 in coordinate mode operation, the operator can, for example, confirm inputted points on the display apparatus 8 or, in a TV conference, a display the image which is displayed on the display apparatus 8 at the other party's side so that participants on the other side who cannot directly see the original can join in the process of coordinate inputting. The manner of operation of this embodiment will now be explained.

The image pickup mode and the coordinate input mode in the second embodiment shown in FIG. 8 are, in many respects, carried out in the same way as in the case of the first embodiment shown in FIG. 4. Therefore, only those points which are different from the first embodiment are described.

Figure 9:
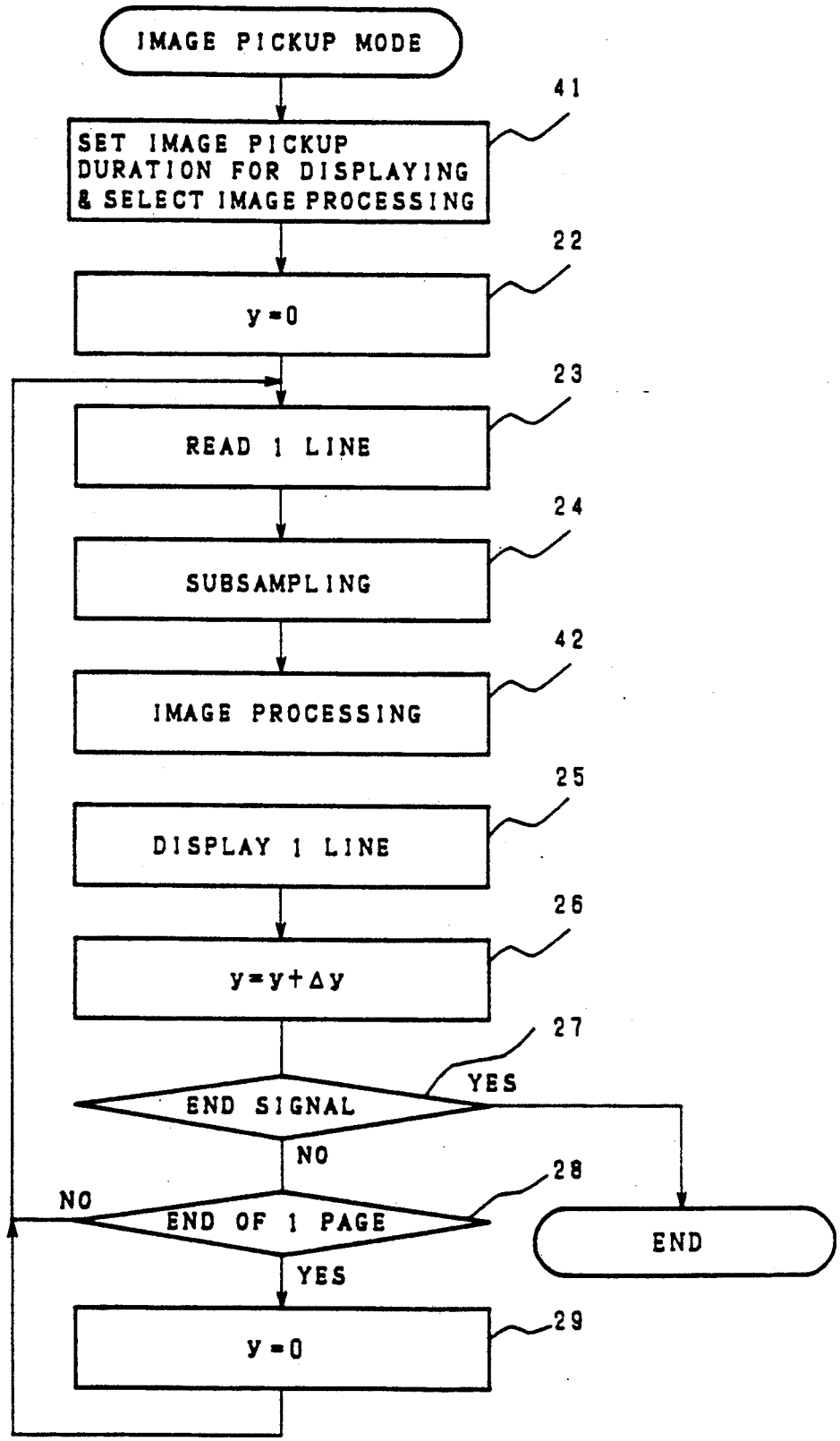
FIG. 9 is a flow chart showing the sequence of processing during the image pickup mode operation thereof.

FIG. 9 is a flow chart showing the procedure of image pickup operation in the FIG. 8 embodiment.

In steps 41 and 42, this embodiment is different from the first embodiment, and in other steps the manner of operation is same as that in the first embodiment.

At step 41, the duration required for image pickup by the image pickup element 4 in image pickup mode operation is selected by the controller 6, and out of a plurality of ways of processing provided in advance, one way of processing compatible with the selected image pickup duration for the image pickup element 4 is chosen, and a signal indicating the selected type of processing is outputted into the image processing circuit 15. At step 42, the selected type of image processing is carried out with respect to post-subsampling image signals by the image processing circuit 15, and then the relevant data is written in the image memory 7 and displayed on the display apparatus 8.

The image processing described herein includes, for example, noise removal, livalent and/or multivalent processing, edge enhancing, smoothing, and a combination thereof, it being intended to convert the input image into a visually fine image. Such image processing is commonly employed in image processing systems using facsimile or image scanner, and very many methods have hitherto been developed for the processing.

In this invention, the scope of such processing is not particularly limited, nor is it essential to the subject matter of the invention. Therefore, details of such processing is omitted. It is understood, however, that these image processings vary according to the type of input image (the nature of the image itself and S/N) and the purpose for which the image is used, and that in the case where the duration of image pickup by the image pickup element 4 is varied as in FIG. 7, various different ways of image processing are required since signal conditions of input image wisely vary.

Figure 10:
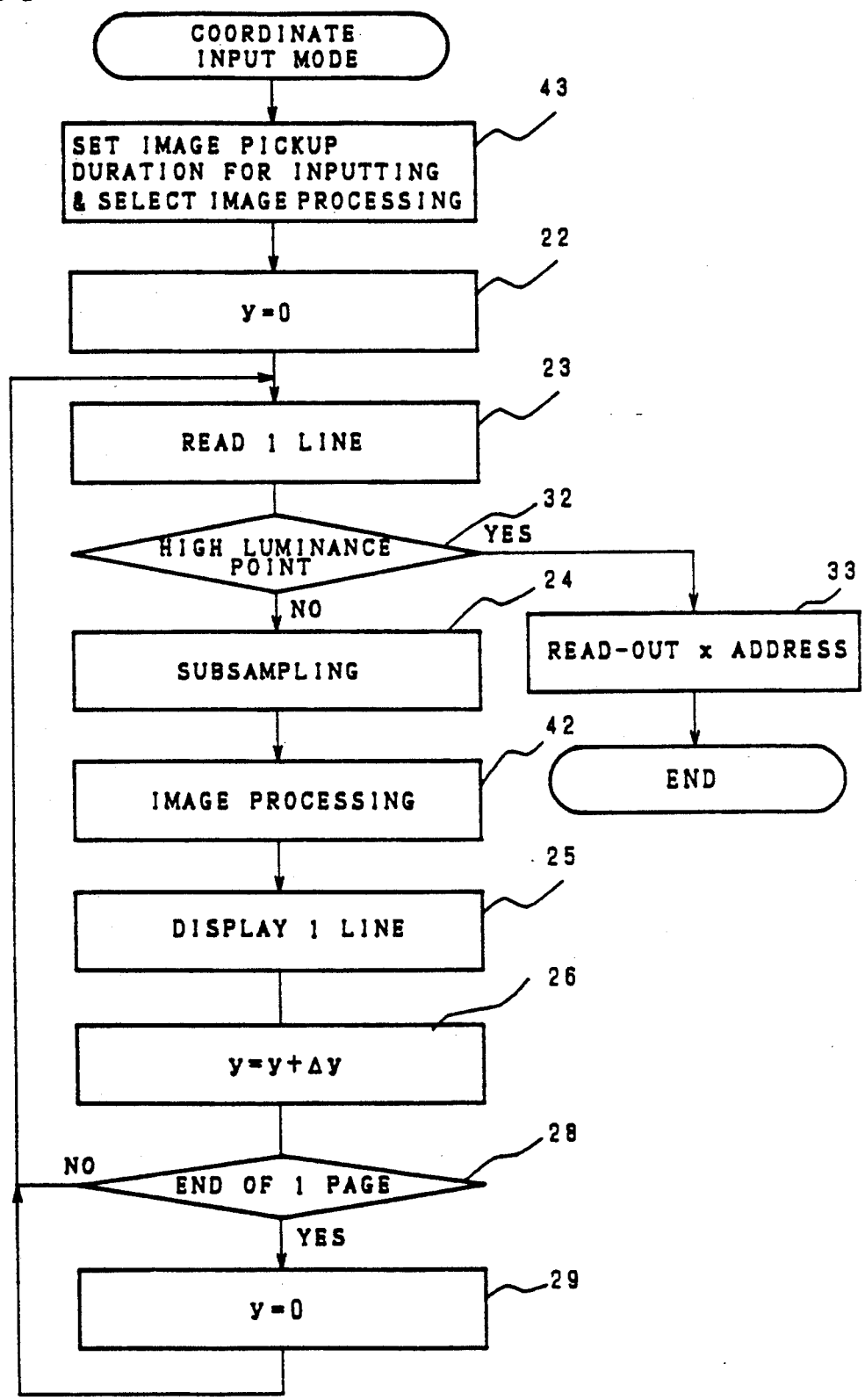
FIG. 10 is a flow chart showing the sequence of processing during the coordinate input mode operation thereof.

FIG. 10 is a flow chart showing the procedure of coordinate input mode operation in the FIG. 8 embodiment. The procedure is different from that in the first embodiment shown in FIG. 4 in that, in steps 24 and 25, images taken are displayed on the display apparatus 8, and in that, as in the case of aforesaid image pickup mode, steps 43 and 42 are added for such image processing that is suitable corresponding to image pickup duration chosen for the image pickup element 4. For example, image signals issued for images taken in such short duration as shown in FIG. 7(b) are lower in signal level than those for images taken in such prolonged length of duration as shown in FIG. 7(a), and accordingly the threshold value for quantization of the luminance level should naturally be changed. Further, in view of relative increased noise component, it is advisable to shorten the step for quantization (e.g., change from 8 bit/pixel to 4 bit/pixel) as compared with the case of prolonged image pickup, thereby to display the image as an image with less gradation, because the noise component will become less noticeable. This may better serve for the purpose of monitoring on the display apparatus 8 the condition of movement of the point indicator 13 on the original 12.

Not shown in FIG. 10, though the point indicator 13 is provided with a switch for putting on and off the light emitting element thereof. When the point indicator 13 is in movement on the original 12, the light emitting element is in off condition, while the switch of the light emitting element is put on for coordinate detection when the operator has determined points for designation.

In the above described embodiment, it is possible to arrange so that the operator can dialogically give instructions to the controller 6 of the image quality required by him, thereby the controller 6 can control the image pickup duration in accordance with the instructions, whereby images of various different qualities can be taken, whereas non-high quality images can be rapidly taken.

In the foregoing description of the embodiments, a point indicator 13 being provided with a light emitting element is used so that coordinates as indicated points can be detected by detecting high peaks in image signals. Needless to say, however, in the case where an ordinary writing pen is used as a point indicator, it is possible to pick up the pen by means of the image processing apparatus (where an ordinary document is used as an original, gradation or toning is not so much required): or by using an image pickup element which is capable of color inputting, for example, a one dimensional image pickup element with a color filter, and a pen-type point indicator having a different color from the original 12, it is possible to distinguish one color from another by the image processing circuit. By these methods, it is also possible to detect the point indicator, thereby to carry out coordinate inputting.

In the foregoing embodiments, the subsampling circuit 9 is used for thinning the number of image signals to be stored in the image memory, but in case where the image memory has sufficient storage capacity and where necessary subsampling and high speed processing can be performed at the stage of displaying or image processing, needless to say, it is unnecessary to provide such subsampling circuit for reducing the number of pixles between the one dimensional image pickup element and the image memory.

In the second embodiment of FIG. 8, the image processing circuit 15 is provided in a later stage of the subsampling circuit 9, but the invention is not limited to such arrangement. A reverse arrangement is permissible, in which case the same effect can be obtained.

In the foregoing embodiments, an image pickup apparatus comprising a one-dimensional image pickup element and a rotative mirror is employed by way of example, but it is needless to say that in this invention any image pickup apparatus can meets the purpose of the invention in so far as it comprises an image pickup element which can control the duration required for image pickup and a scanning control apparatus which can vary the duration for scanning according to the duration for the image pickup.

As described above, according to the invention, the coordinate input apparatus is operable in two modes, namely, original image pickup mode and coordinate input mode, so that in the coordinate input mode, by reducing the duration required for image pickup, images of both the original and the point indicator can be picked up in a shorter duration by the image pickup control apparatus than that in the case of the image pickup mode, and by employing detecting apparatus, locations of the point indicator can be detected from signals of images, so the images having high resolution, high gradation, and high quality characteristics can be taken and fast-responsive coordinate detection can be accomplished.

Furthermore, the apparatus of the invention has an image processing circuit which performs image processing with respect to image signals in such way that it is highly consistent with the image pickup duration selected for image pickup, so that in coordinate input mode operation, the location of the point indicator can be properly detected and so that the condition of points on the original being indicated by the point indicator can be displayed as a fine image on the display apparatus; hence, greater ease of operation and high efficiency in coordinate inputting can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A coordinate input apparatus comprising:
    an image pickup apparatus which picks up an image of an object for image-taking and outputs an image signal;
    a point indicator for indicating a point on said object;
    a location detecting apparatus for detecting the location of the point which is indicated by said point indicator, by means of processing the image signals which are outputted from said image pickup apparatus and include an image of an object for image-taking and an image of said point indicator;
    a display apparatus for displaying thereon at least one of the image taken by said image pickup apparatus and the point increased by said point indicator detected by said location detecting apparatus;
    mode switching means for selectively setting either an image pickup mode for displaying an image of an object on said display apparatus or a coordinate input mode for inputting as coordinates the location of a point indicated by said point indicator and for displaying the coordinates on said display apparatus; and
    an image pickup duration control circuit for controlling image pickup duration of said image pickup apparatus so that the duration is shorter when said coordinate input mode is set than when said image pickup mode is set.

2. A coordinate input apparatus as set forth in claim 1, wherein said image pickup apparatus is a charge coupled device.

3. A coordinate input apparatus as set forth in claim 1, further comprising an image processing circuit which executes optimum image processing with respect to image signals outputted from said image pickup apparatus according to the image pickup duration being controlled by said image pickup duration control circuit.

4. A coordinate input apparatus as set forth in claim 1, wherein said point indicator indicates a point on said object for image taking by means of a light emitting element, and said location detecting apparatus detects a high luminance location on said object.

5. A coordinate input apparatus as set forth in claim 4, wherein said image pickup apparatus is a charge coupled device.

* * * * *